United States Patent [19]

Zerod et al.

[11] Patent Number: 5,428,830
[45] Date of Patent: Jun. 27, 1995

[54] CONCEALED ANTENNA SYSTEM WITH REMOTE VARIABLE GAIN RF AMPLIFIER

[75] Inventors: Richard D. Zerod, Livonia; George F. Tannery, IV, Ypsilanti; Mohamman-Reza S. Movahhed, Ann Arbor, all of Mich.

[73] Assignee: Ford Motor Company, Dearborn, Mich.

[21] Appl. No.: 123,124

[22] Filed: Sep. 17, 1993

[51] Int. Cl.6 .............................................. H04B 1/18
[52] U.S. Cl. .................. 455/282; 455/234.1; 455/291; 455/293; 455/345
[58] Field of Search ...................... 455/280–283, 455/286, 287, 289, 291, 293, 345, 234.1, 234.2, 249.1, 250.1; 343/702, 711–713

[56] References Cited

U.S. PATENT DOCUMENTS

| | | | |
|---|---|---|---|
| 3,484,584 | 12/1969 | Shaw, Jr. | 219/522 |
| 3,634,888 | 1/1972 | Reidy | 343/702 |
| 3,771,159 | 11/1973 | Kawaguchi | 343/729 |
| 3,866,232 | 2/1975 | Weigt | 343/713 |
| 4,086,594 | 4/1978 | Kropielnicki et al. | 343/704 |
| 4,228,544 | 10/1980 | Guyton | 455/282 |
| 4,247,954 | 1/1981 | Sauer | 455/243 |
| 4,439,771 | 3/1984 | Kume et al. | 343/704 |
| 4,739,516 | 4/1988 | Starkloff et al. | 455/269 |
| 4,791,426 | 12/1988 | Lindenmeier et al. | 343/713 |
| 4,910,796 | 3/1990 | Nakase et al. | 455/197 |
| 5,083,133 | 1/1992 | Takayama | 343/704 |
| 5,230,096 | 7/1993 | Davies et al. | 455/291 X |

FOREIGN PATENT DOCUMENTS

| | | | |
|---|---|---|---|
| 58-50833 | 3/1983 | Japan | 455/291 |
| 4-115724 | 4/1992 | Japan | 455/345 |
| 9001059 | 7/1990 | WIPO | . |

OTHER PUBLICATIONS

Zerod, Richard D., "Advances in Concealed AM/FM Antenna System Design", SAE Technical Paper Series No. 930952, presented at Int'l Congress & Exposition, Det., Mich., Mar. 1–5, 1993.

*Primary Examiner*—Edward F. Urban
*Assistant Examiner*—Chi H. Pham
*Attorney, Agent, or Firm*—Roger L. May; Mark L. Mollon

[57] ABSTRACT

A concealed antenna system for motor vehicle radios replaces a radio chassis preamplifier with a remote radio frequency amplifier packaged with a filter module adjacent the antenna conductors to reduce the noise floor before transmitting the signal by a highly capacitive cable to the radio chassis. The dynamic range of the antenna system is improved by an automatic gain control feedback signal from the radio chassis to the RF amplifier so that the gain of the amplifier is reduced in the presence of a strong AM signal. Preferably the antenna conductors comprise embedded conductors in an insulating panel of a motor vehicle such as the vehicle rear window, and the AM conductor may be conveniently provided by the heater grid for the window panel.

8 Claims, 3 Drawing Sheets

CONCEALED ANTENNA SYSTEM WITH REMOTE VARIABLE GAIN RF AMPLIFIER

FIELD OF THE INVENTION

The present invention relates generally to antennas for radio frequency signal reception at a radio receiver on-board motor vehicles and, more particularly, to a circuit interface between the radio receiver and antennas concealed in a vehicle body panel.

BACKGROUND ART

Although whip or aerial antennas have been used on motor vehicles because they offer very good reception for a mobile receiver, they suffer the disadvantages that they provoke wind noise and aerodynamic drag, they interfere with or detract from the styling of the vehicle body and they are exposed to mechanical damage. Accordingly, attempts have been made to conceal the antennas since the mid-1970s. However, previous designs for example, antennas mounted in the front glass, were discontinued because previously known designs suffered from poor reception performance under weak field strength conditions and due to their high susceptibility to pick up vehicle electrical noise.

Some improvements have been made in antenna design in order to overcome the previously identified problems. For example, slot antennas have exhibited improved performance over previously known embedded conductor antennas. However, slot antennas are made with a large surface of conductive material in which the slot is formed. However, large body panels that contain such conductive surfaces are often not well aligned for optimum signal reception. Moreover, when considering the substantial metallic content of most vehicle structures, the dimensions of the passenger compartment comprise an electrically small enclosure compared with the wave length of the frequencies in an AM broadcast band. Such a structure significantly attenuates the signal, and thus skilled designers would be conventionally encouraged to conceal an AM antenna at a location outside the cabin enclosure.

Antennas formed by conductors located in or on the vehicle glass is another known implementation of a concealed antenna system. Conducting lines or surface strips, for example, contained in the rear glass assembly, may provide sufficient gain for good AM and FM reception. For example, a heater grid structure that exists on many vehicles for window defogging or defrosting has been used as an AM antenna. However, as the effective antenna length is increased with this type of design, the antenna source capacitance increases. Additionally, the close proximity to sheet metal body panels results in an increased shunt capacitance to ground. In addition, any capacitance imposed by a cable connecting the antenna to a radio signal receiver in the motor vehicle will add substantially to the shunt capacitance and thus substantially reduce the reception performance between the antenna and the receiver.

In addition, the proximity of antennas to noisy vehicle wiring and ground loops, as noise currents often flow in the sheet metal as part of the ground return for many different circuits, can result in a coupling of unwanted noise into the antenna system. Accordingly, careful grounding, wire routing and EMC suppression procedures would appear to be necessary to effectively divert noise currents away from the antenna circuit. As a result, the additional features to implement these considerations substantially increase the complexity and expense of incorporating such antennas in motor vehicles.

Low noise broad band preamplifiers have been used to compensate for reduced antenna gain and improve weak signal reception. While such amplifiers increase the signal level delivered to the receiver, the improvement in the signal to noise ratio perceived by a listener may be minimal due to an ambient RF noise level near the vehicle. In addition, preamplifiers may degrade the dynamic range of the receiver system resulting in the increased incidence of overload, inter-modulation and cross-modulation distortion. This problem is particularly acute during reception of extremely strong transmission due to for example close proximity to signal source transmitter. Although the added preamplifier gain will improve overall system gain, the ambient noise level must be sufficiently low in order to realize an improvement in the signal to noise ratio. Thus, the theoretical improvement sought to be obtained by the radio frequency preamplifier may be made ineffective by man made, natural and atmospheric noise often encountered. In addition, an additional amplifier substantially increases the cost and complexity of the interface circuit between the antenna and the radio receiver.

SUMMARY OF THE PRESENT INVENTION

The present invention overcomes the above-mentioned disadvantages by providing an apparatus and method for improving signal reception by preamplifying the voltage obtained by illumination of the antenna at a location closely adjacent a concealing panel and preceding cable transmission to the radio receiver. In general, an antenna conductor carried by a concealing panel is coupled by the leads to a RF amplifier packaged closely adjacent the concealing panel so that the output of the amplifier can be coupled to a coaxial cable leading to the radio receiver. The leads are preferably provided by a filter module of known type, for example, a known isolator and radio frequency interference suppressor combination, that provides a convenient and close mounting location for the preamplifier. Preferably, the radio frequency amplifier has a variable gain, and the automatic gain control is preferably provided by a DC voltage transmitted through the coaxial cable coupling the signal to the radio receiver.

In the preferred embodiment, a radio receiver provides the DC voltage whose magnitude is inversely related to the signal strength received by the radio receiver, to adjust the gain in the amplifier so that a signal to noise ratio is maintained without loss of dynamic range in the signal transmitted to the radio receiver. Moreover, an implementation of the preferred embodiment of the present invention includes a motor vehicle window panel with two antenna conductors embedded in the window panel without substantially obscuring visibility through the window panel. In addition, the preamplifier conventionally included in the radio receiver is isolated from the radio receiver chassis and packaged in a known filter module mounted adjacent the window panel. As a result, the improved signal strength transmitted from the filter module to the radio receiver through a coaxial cable does not require additional connectors and circuitry such as power connections and associated filtering as would be required with the mere addition of a separate amplifier.

Thus, the present invention permits a concealed antenna conductor to provide improved reception comparable to those obtained by whip or aerial antennas but without the coincident disadvantages of such antennas. In addition, the present invention permits these advantages to be obtained without the additional cost of circuitry not previously provided in known antenna arrangements. Furthermore, the improved signal to noise ratio can be obtained without sacrificing dynamic range. Moreover, the present invention does not require extra connections including body harness wiring to supply power to the radio frequency amplifier. The added gain, before cable attenuation, will result in a reduction in the system noise floor, and the overall noise figure will be dominated by the relatively low noise figure of the RF amplifier.

Moreover, it is an advantage of the present invention that DC voltage may be provided from the radio receiver along the coaxial cable to provide power to the RF amplifier as well as an automatic gain control feedback signal for the RF amplifier. Furthermore, since the source of DC voltage is the radio chassis, the DC source has been filtered from transients by existing protection circuitry in the radio and eliminates the need for extra transient protection circuitry for the RF amplifier. Preferably, the DC voltage is applied to the central conductor of the antenna cable connector between the radio chassis and the existing antenna module to eliminate the need for extra body wiring and connectors. As a result, the present invention provides minimal additional circuitry and system costs to improve the performance of concealed antennas. In addition, the present invention does not require additional body wiring to provide power or feedback signals from the radio. Nevertheless, the present invention provides improved signal reception, particularly for AM frequency range signals, in which the noise floor is reduced, and sensitivity is increased without compromising the dynamic range of the signal transmission.

BRIEF DESCRIPTION OF THE DRAWING

The present invention will be better understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
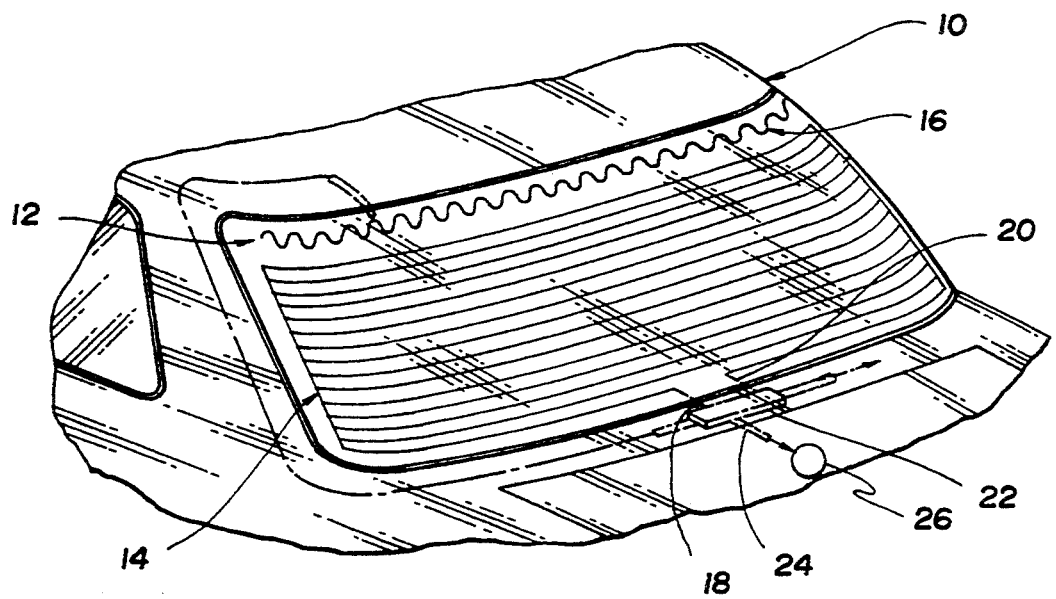
FIG. 1 is a perspective view of a motor vehicle body portion incorporating a concealed antenna and RF amplifier connection to a radio receiver in accordance with the present invention.

Referring first to FIG. 1, a vehicle 10 is thereshown in which a concealing panel 12 in the form of a rear window carries a first antenna conductor 14 in the form a heater grid and a second antenna conductor 16 particularly designed for FM reception. As used in this application, express references to a concealed antenna and concealing panel refer to any conductor conforming to a motor vehicle panel and the respective panel employed as a support for the conductor, regardless of its composition or placement in the motor vehicle. The conductors 14 and 16 are connected by appropriate leads as diagrammatically indicated at 18 and 20 to a filter module 22. The filter module housing 22 is mounted adjacent the rear window 12 to expedite connection to the antennas 14 and 16 and avoid imposing substantial impedance on the signal received through the antenna conductors 14 and 16. The filter module housing 22 has internal circuits electrically connected through a cable 24 to radio receiver 26 as will be described in greater detail hereinafter. Although the present invention involves electrical circuit developments distinguishing the present invention from previously known antenna systems, the basic system architecture described remains simple and consistent with previously known antenna structures to the extent possible to avoid additional or duplicative circuitry while improving performance of the antenna system.

Figure 2:
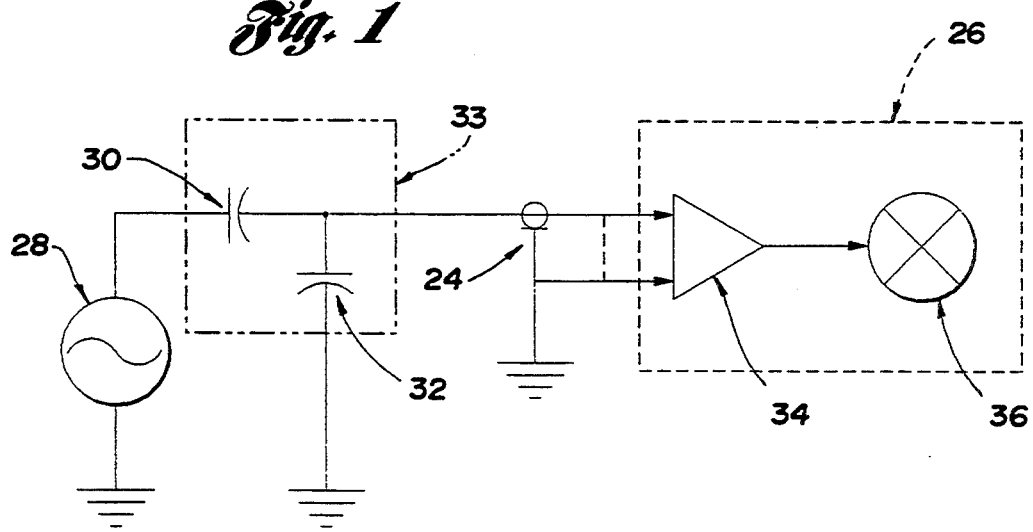
FIG. 2 is a schematic diagram of the previously known system constructed with the architecture shown in FIG. 1.

Referring now to FIG. 2, a general schematic representation shows a previously known antenna circuit in which the antenna's reception of a signal is modeled by a voltage source 28 coupled through a series capacitance 30 and a shunt capacitance 32. The antenna is coupled through a cable 24 to the radio chassis 26. A radio chassis 26 may be of a conventionally known type with appropriate tuning circuits, balance control, fade control, equalizer control and other systems popularly included in entertainment systems such as those used in motor vehicles. However, in depicting the previously known radio chassis 26, it is important to note that a radio frequency amplifier 34 is used as a preamplifier to receive the signal from the cable 24 before entry into the remaining circuitry 36. Capacitance 32 is substantially enlarged by reason of the cable 24 and may generate a loss of 16 to 20 db before the signal is introduced into the preamplifier 34. In contrast, the RF amplifier introduces a noise factor of approximately 3 db, rendering the overall system noise figure at about the 19 or 23 db range. The system noise figure is an indicator of the performance and sensitivity deviations from an ideal system that would be limited only by thermal noise. If the antenna cable is sufficiently long, a voltage divider relationship exists between the antenna and cable capacitances and the signal loss is directly added to the system noise figure.

Figure 3:
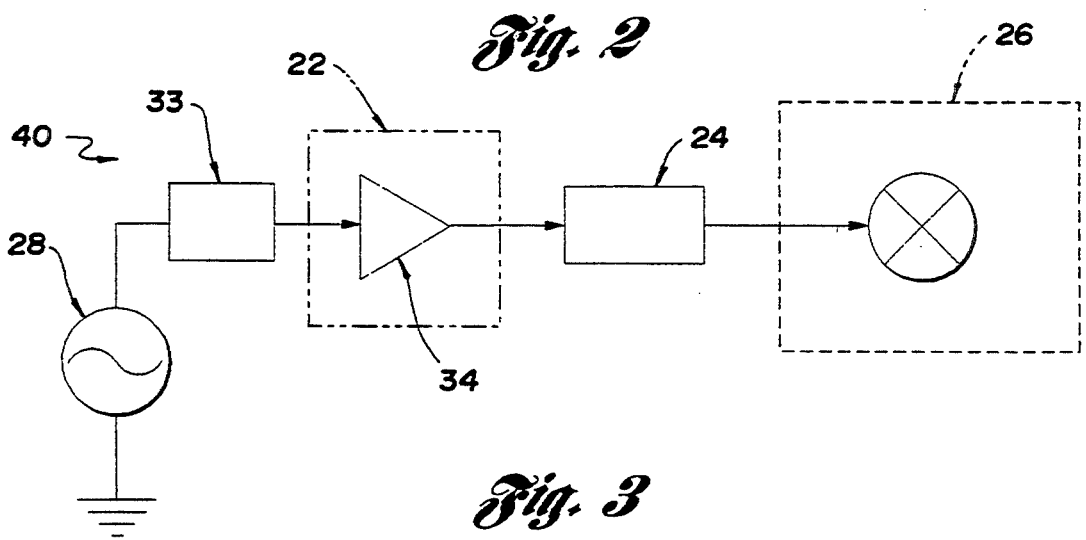
FIG. 3 is a diagrammatic representation of a system modification according to the present invention and incorporated by the architecture shown in FIG. 1.

FIG. 3 demonstrates a methodology of minimizing the noise figure according to the present invention by placing an RF amplifier at the feed point of the antenna before the antenna cable. The added gain, before cable attenuation, will result in a reduction in the system noise floor. The overall noise figure will then be dominated by the relatively small noise figure of the RF amplifier. As shown in FIG. 3, the RF amplifier 34 is placed before a cable 24 to improve the signal to noise ratio before the signal is affected by attenuation in the cable 24. Preferably, the RF amplifier 34 replaces the preamplifier normally provided on the radio chassis 26. Moreover, the RF amplifier 34 is preferably packaged with the filter circuits and the filter module 22 as diagrammatically indicated in FIG. 3.

Figure 4:
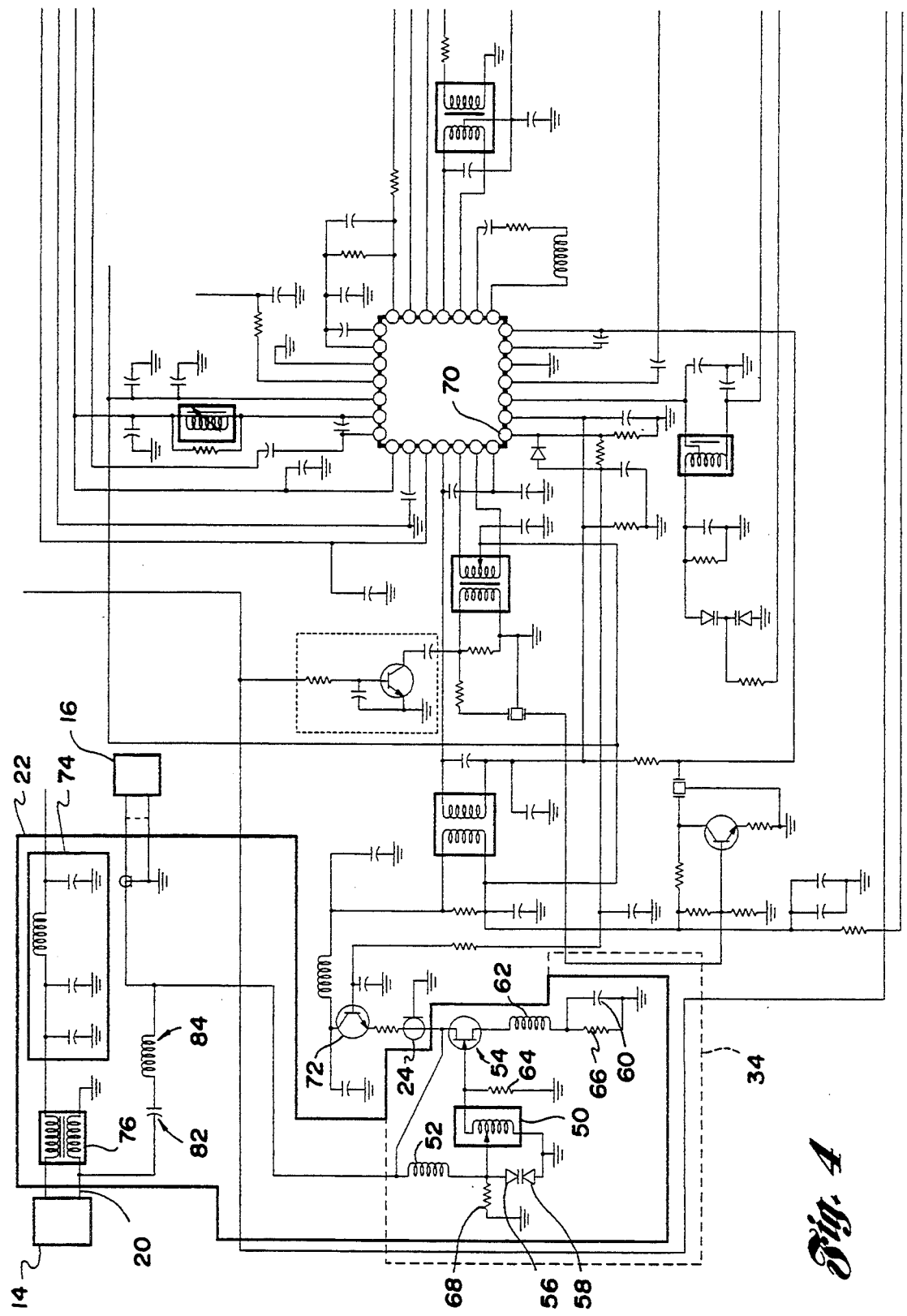
FIG. 4 is a diagrammatic representation of a portion of the circuit shown in FIG. 3.

As shown in FIG. 4 with reference to a schematic of a Ford F2VF-19B165-AA radio chassis, RF amplifier 34 is removed to a filter module housing 22 as diagrammatically represented on the schematic diagram. The input from the antenna cable is applied to transformer 50 through the inductor 52. Transformer 50 forms a high pass filter to minimize interference or overload from signals below approximately 100 kilohertz. The output of the high pass filter is applied to the common source JFET 54 that forms the RF amplifier 34. Diodes 56 and 58 provide protection from transient voltages that could potentially destroy the transistor 54. Likewise relocated from the radio chassis 26 to the concealed antenna module 22 are the capacitors 60 for DC biasing, inductors 62 for gain compensation and high-frequency signal rejection, resistor 64 for high frequency stability and impedance matching, and resistor 66 for DC biasing. In addition, resistor 68 provides impedance matching to the AM antenna element.

The other portion of the filter module 22 includes a first filter 74 to filter out any noise components during actual heater grid operation, and an isolator 76 to isolate the heater grid above RF ground in the AM broadcast band frequencies.

As best shown in FIG. 4, a system 40 preferably includes an automatic gain control (AGC) feedback signal so that the RF amplifier will not overload in the presence of strong broadcast signals. However, unlike the anticipated requirements for adding wiring and connectors to generate, transmit and respond to an AGC feedback signal with a remote amplifier 34, a DC voltage is supplied to the RF amplifier 34 from the radio chassis 26 by the central conductor of the coaxial cable 24.

As also shown in FIG. 4, the AM tuner integrated circuit provides an output voltage at pin 70 that decreases in the presence of strong AM signals. This terminal is coupled to provide the DC supply voltage and a voltage for controlling the automatic gain function. The gain control voltage is reduced by resistors so that it can be applied to the base of the transistor 72, whose emitter is connected to the drain of the transistor 54. The drain voltage of transistor 54 is approximately equal to the automatic gain control voltage minus the emitter-base voltage drop of transistor 72. As the automatic gain control voltage decreases in the presence of strong signals, the drain voltage of transistor 54 also decreases. The reduced drain voltage reduces the gain of transistor 54 by reducing the gain-source voltage differential and thereby prevents reduction of the dynamic range due to overload in the presence of strong broadcast signals.

Figure 5:
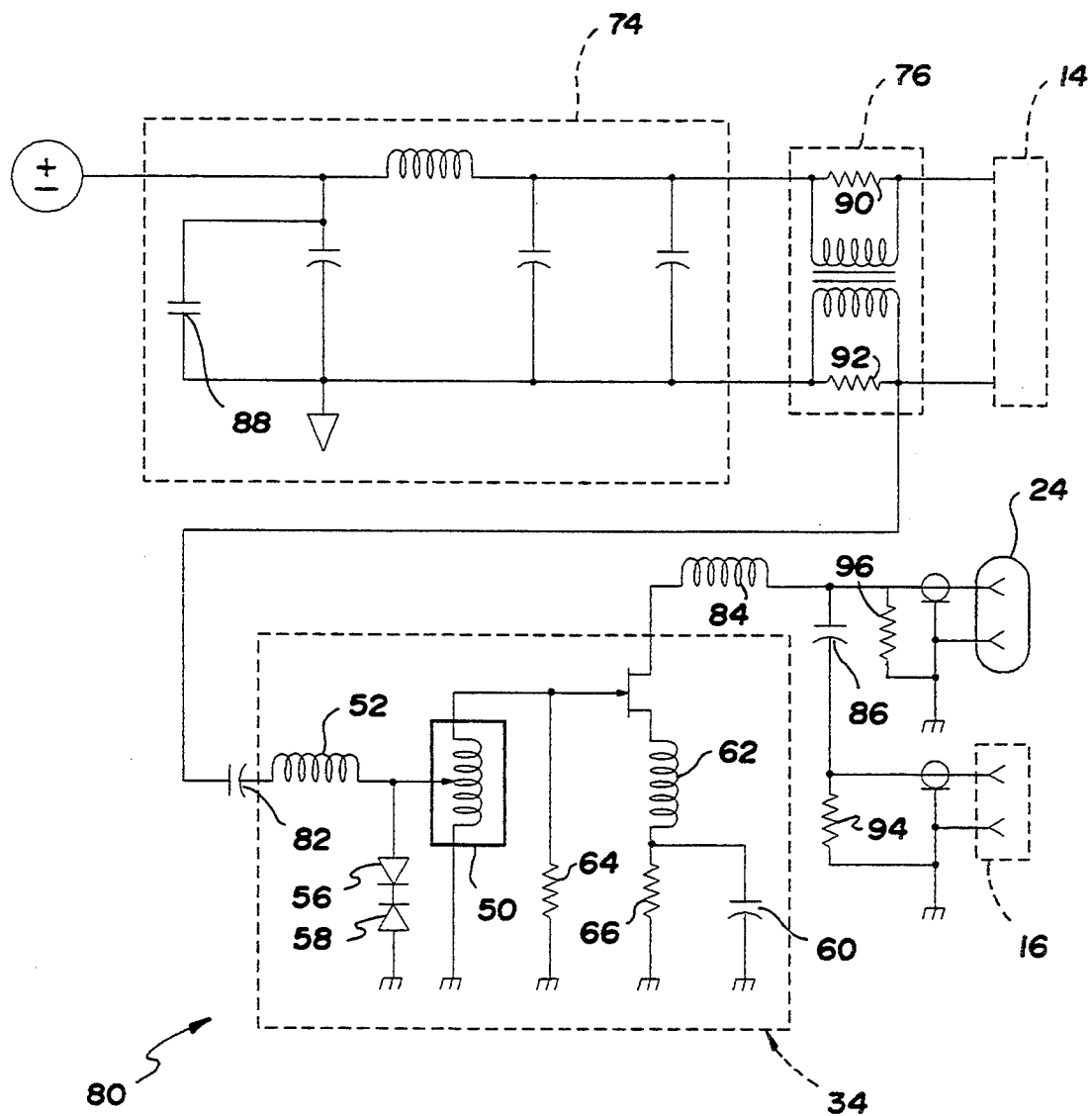
FIG. 5 is a schematic representation of a modified portion of the apparatus shown in FIG. 3.

Referring now to FIG. 5, an improved filter configuration 80 for the filter module 22 includes preamplifier 34 interposed between the capacitor 82 and the inductor 84 which prevents the AM RF amplifier 34 from degrading performance of the FM antenna 16 and transmission of the signal to the radio chassis 26. An additional switch in the form of capacitor 86 couples the FM antenna 16 to the terminals of cable 24 to prevent the RF amplifier from being detuned by reception at the FM antenna element 16.

In addition, radio frequency filter 74 includes an additional capacitor 88 in order to filter noise from the heater grid power supply wiring. In addition, the isolator 76 provides relatively constant impedance to the RF amplifier circuitry by the parallel connection of resistors 90 and 92 across the coils of the transformer forming the isolator 76. In addition, resistor 94 is coupled across the leads of the FM antenna 16 to provide a convenience for determining the integrity of the cable connections during vehicle service. Similarly, a resistor 96 is connected across the terminals of the cable 24 to provide a convenience for determining the integrity of the cable connections during vehicle service.

As a result, the present invention provides a means for decreasing system noise floor and improving the antenna system sensitivity for a concealed AM antenna system. The RF amplifier is remotely located from the radio chassis, preferably as a replacement for the radio chassis preamplifier to minimize the need for additional circuitry, wiring and cost to the system. Also the dynamic range of the system is maintained by adding a feedback signal from the radio chassis that not only delivers DC voltage for operation of the amplifier, but also a gain control signal inversely related to the strength of the signal reception to reduce the gain of the RF amplifier in the presence of strong AM signals.

Having thus described the present invention, many modifications thereto will become apparent to those skilled in the art to which it pertains without departing from the scope and spirit of the present invention as defined in the appended claims.

We claim:

1. An audio system including a concealed antenna structure located in a remote location from a radio receiver, comprising:
   at least one antenna conductor carried by a concealing panel;
   a radio frequency amplifier having an input in electrical contact with said conductor, and having an output, said amplifier being mounted in adjacent physical position with respect to said concealing panel;
   a coaxial cable coupled between said RF amplifier output and said radio receiver;
   a DC power source in said radio receiver coupled through said coaxial cable for driving said RF amplifier; and
   wherein said DC power source has a voltage varying inversely with the strength of RF signals received by the antenna conductor, and wherein said amplifier includes an automatic gain control coupled to said DC power source.

2. The audio system as defined in claim 1 wherein said radio receiver further comprises a radio chassis constructed without a radio frequency preamplifier.

3. An antenna system for a motor vehicle having a concealing panel comprising:
   a first antenna conductor carried by the concealing panel;
   a second antenna conductor carried by the concealing panel;
   a connector housing coupled to said first antenna conductor and carrying a filter for removing radio frequency interference signals from RF signals received by said first antenna conductor, and a radio frequency amplifier coupled to the output of said filter;
   a radio chassis carrying an AM tuner, an FM tuner, and a signal amplifier packaged separately from said connector housing;
   a coaxial cable coupling the output of said radio frequency amplifier to said signal amplifier of said radio chassis;
   wherein said RF amplifier includes an automatic gain control with an output voltage inversely related to the strength of the signal received by one of said antenna conductors; and wherein said AM tuner generates a DC signal varying inversely with the strength of the AM signal received at said signal amplifier, and said automatic gain control receives said DC signal through said coaxial cable.

4. The antenna system as defined in claim 3 wherein said first conductor comprises a window panel heater grid.

5. The antenna system as defined in claim 4 wherein said motor vehicle includes a DC power source for applying DC voltage to said heater grid, and wherein said filter includes an isolator for isolating the heater grid above radio frequency ground in the AM broadcast band frequencies.

6. A method for improving radio frequency signal reception of a concealing panel-carried antenna for motor vehicles comprising:

preamplifying the radio frequency signal received by the antenna before transmitting the signal by a cable to a radio receiver chassis by locating a radio frequency amplifier adjacent the window panel and coupling said radio receiver chassis by a coaxial cable with said RF amplifier;

adjusting the gain of said amplifier inversely to the strength of the signal received; and wherein said adjusting step includes transmitting a voltage varying DC signal from the radio receiver chassis to said RF amplifier over said coaxial cable to adjust said gain.

7. The method as defined in claim 6 wherein said preamplifying step comprises mounting said RF amplifier remotely from said radio chassis and omitting a radio frequency preamplifier in said radio chassis.

8. The method as defined in claim 7 wherein said mounting step comprises packaging said RF amplifier in a common housing with a signal filter.

* * * * *